US008706765B2

(12) United States Patent
Inoue et al.

(10) Patent No.: US 8,706,765 B2
(45) Date of Patent: Apr. 22, 2014

(54) METHOD TO RAISE ACCURACY OF TARGETING THE SEGMENTATION FOR SAMPLE DISTRIBUTION

(75) Inventors: Kenichi Inoue, Chiba-ken (JP); Akira Tada, Kanagawa-ken (JP); Yohei Takabe, Tokyo (JP); Satoru Watanabe, Tokyo (JP)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 1056 days.

(21) Appl. No.: 11/761,661

(22) Filed: Jun. 12, 2007

(65) Prior Publication Data
US 2007/0233729 A1    Oct. 4, 2007

Related U.S. Application Data

(63) Continuation of application No. 10/959,116, filed on Oct. 7, 2004.

(30) Foreign Application Priority Data

Oct. 10, 2003    (JP) ................................. 2003-352405

(51) Int. Cl.
*G06F 17/30*    (2006.01)
*G06Q 30/00*    (2012.01)

(52) U.S. Cl.
USPC ....................................... 707/793; 705/14.38

(58) Field of Classification Search
USPC ............ 707/758, 793, 796; 705/14.32, 14.37, 705/14.38
See application file for complete search history.

(56) References Cited

U.S. PATENT DOCUMENTS

| 6,021,362 A | * | 2/2000 | Maggard et al. ............... 700/234 |
| 6,230,204 B1 | * | 5/2001 | Fleming, III ................... 709/229 |

(Continued)

FOREIGN PATENT DOCUMENTS

| JP | 2001101274 A | 4/2001 |
| JP | 2001339358 A | 12/2001 |

(Continued)

OTHER PUBLICATIONS

Final Office Action dated Jan. 6, 2011 in U.S. Appl. No. 10/959,116.

(Continued)

*Primary Examiner* — Robert Timblin
(74) *Attorney, Agent, or Firm* — Andrew M. Calderon; Roberts Mlotkowski Safran & Cole

(57) ABSTRACT

To enhance the targeting accuracy in providing services such as provision of samples for members by performing management of member information and authentication while securing personal anonymity. There is provided a center server and a store terminal. The center server gives a unique ID to a member application, sends it to a particular mobile information terminal and manages it as authentication information about a member who is the user of the mobile information terminal. In response to purchases of a particular article by the member, the store terminal inputs the ID from the mobile information terminal and inputs purchase information about the article the member purchases. The center server then acquires attribute information about a member identified by the ID. Then, by checking the purchase information, the attribute information and service information set in association with attribute information about the member and kinds of articles and stored in particular storage means, information about a service to be provided for the member is identified.

13 Claims, 9 Drawing Sheets

(56) References Cited

U.S. PATENT DOCUMENTS

| | | | |
|---|---|---|---|
| 6,606,745 B2* | 8/2003 | Maggio | 725/23 |
| 6,832,240 B1* | 12/2004 | Dutta | 709/203 |
| 6,889,198 B2* | 5/2005 | Kawan | 705/14.27 |
| 6,941,363 B2 | 9/2005 | Ito et al. | |
| 7,184,970 B1* | 2/2007 | Squillante | 705/14.27 |
| 7,383,200 B1* | 6/2008 | Walker et al. | 705/10 |
| 2001/0039535 A1* | 11/2001 | Tsiounis et al. | 705/71 |
| 2001/0047489 A1* | 11/2001 | Ito et al. | 713/202 |
| 2001/0049624 A1* | 12/2001 | Uyama et al. | 705/14 |
| 2002/0046085 A1 | 4/2002 | Rochon et al. | |
| 2002/0049631 A1* | 4/2002 | Williams | 705/14 |
| 2002/0053076 A1* | 5/2002 | Landesmann | 725/10 |
| 2002/0059147 A1* | 5/2002 | Ogasawara | 705/70 |
| 2002/0107717 A1 | 8/2002 | Liu et al. | |
| 2002/0120516 A1 | 8/2002 | Sakagami et al. | |
| 2002/0161630 A1* | 10/2002 | Kern et al. | 705/14 |
| 2003/0027635 A1 | 2/2003 | Walker et al. | |
| 2003/0028424 A1* | 2/2003 | Kampff et al. | 705/14 |
| 2003/0055723 A1* | 3/2003 | English | 705/14 |
| 2003/0088442 A1* | 5/2003 | Michael et al. | 705/3 |
| 2003/0163374 A1 | 8/2003 | Akiyama | |
| 2003/0212599 A1* | 11/2003 | Kepecs | 705/14 |
| 2004/0002897 A1* | 1/2004 | Vishik | 705/14 |
| 2004/0054604 A1 | 3/2004 | Frejlev et al. | |
| 2004/0140361 A1 | 7/2004 | Paul et al. | |
| 2004/0181448 A1 | 9/2004 | Hartsman et al. | |
| 2005/0071228 A1* | 3/2005 | Bortolin et al. | 705/14 |
| 2005/0219068 A1* | 10/2005 | Jones et al. | 341/50 |

FOREIGN PATENT DOCUMENTS

| | | |
|---|---|---|
| JP | 2002007847 A | 1/2002 |
| JP | 2002-41754 | 2/2002 |
| JP | 2002042102 A | 2/2002 |
| JP | 2002-99700 | 4/2002 |
| JP | 2002099799 A | 4/2002 |
| JP | 2002216249 A | 8/2002 |

OTHER PUBLICATIONS

Office Action dated Jul. 23, 2010 in U.S. Appl. No. 10/959,116.
Office Action dated Feb. 3, 2010 in U.S. Appl. No. 10/959,116.
Office Action dated Aug. 20, 2009 in U.S. Appl. No. 10/959,116.
Office Action dated Feb. 24, 2009 in U.S. Appl. No. 10/959,116.
Office Action dated Aug. 21, 2008 in U.S. Appl. No. 10/959,116.
Final Office Action dated May 13, 2008 in U.S. Appl. No. 10/959,116.
Final Office Action dated Aug. 26, 2007 in U.S. Appl. No. 10/959,116.
Office Action dated Apr. 12, 2007 in U.S. Appl. No. 10/959,116.
Notice of Allowance dated Jul. 24, 2012 in U.S. Appl. No. 10/959,116.
Office Action dated Nov. 28, 2011 for corresponding U.S. Appl. No. 10/959,116.
Office Action dated Jun. 13, 2011 for corresponding U.S. Appl. No. 10/959,116.

* cited by examiner

Figure 7

| SEX | AGE GROUP | ARTICLE NAME OCCUPA-TION | ARTICLE A | ARTICLE B | ARTICLE C | ARTICLE D | ... |
|---|---|---|---|---|---|---|---|
| Female | 20-24 | STUDENT | | | | | |
| | | OFFICE WORKER | | (NEW BRAND LIPSTICK) | | | |
| | | HOUSE-WIFE | | | (DETERGENT PRODUCED FROM NEW NATURAL MATERIAL) | | |
| | 25-29 | OFFICE WORKER | | (NEW BRAND LIPSTICK) | | | |
| | | HOUSE-WIFE | | | | | |
| | | ... | | | | | |
| | 30-34 | HOUSE-WIFE | | | | | |
| | ... | ... | | | | | |
| | ... | ... | | | | | |
| Male | 20-24 | STUDENT | | | | | |
| | ... | ... | | | | | |
| | ... | ... | | | | | |

METHOD TO RAISE ACCURACY OF TARGETING THE SEGMENTATION FOR SAMPLE DISTRIBUTION

CROSS REFERENCE TO RELATED APPLICATIONS

This application is a continuation of U.S. patent application Ser. No. 10/959,116, filed Oct. 7, 2004, the disclosure of which is expressly incorporated by reference herein in its entirety.

BACKGROUND OF THE INVENTION

1. Field of the Invention

The invention relates to a system for managing information about members and performing various services such as provision of samples depending on the attributes of the members.

2. Background Description

As an approach to stimulate consumers' appetite for purchase of articles, such as cosmetics and health food, samples are distributed. To enhance the effect of the approach, it is important to identify (target) an appropriate group of potential purchasers for an article and provide a sample of the article for the group. Conventionally, as means for enhancing the accuracy of targeting the group of potential purchasers, there has been adopted a method of, based on the assumption that readers of particular magazines or purchasers of other articles are overlapped with a group of potential purchasers for a target article, providing a sample of the article for those who have purchased such magazines or other articles at stores. In this case, the result of distributing samples may be managed by collecting information about the distributed samples, for example, by reading bar-codes attached to the samples provided for the purchasers of the magazines and the like with the use of a terminal of a POS (point-of-sales) system.

Furthermore, personal information may be registered with a predetermined database, and services, such as provision of samples, according to the attributes of each person may be performed, based on attribute information (such as interests, preferences, age, sex, and occupation) included in the personal information (Published Unexamined Patent Application No. 2002-99700, for example). There is also proposed a mechanism in which a member network is constructed online, samples are distributed based on personal information and attribute information about the members, and questionnaires are distributed and collected via e-mail by utilizing the network in order to grasp the utilization trend after the samples are distributed (Published Unexamined Patent Application No. 2002-41754, for example).

By managing personal attribute information in a database and distributing samples in consideration of the attributes of each person as in the prior-art techniques, the accuracy of targeting a group of potential purchasers for a target article can be enhanced, and thereby effectively stimulating the consumers' appetite for the target article.

As described above, when attempting to stimulate consumers' appetite for purchase of an article through services such as provision of samples, it is important to realize suitable targeting of a group of potential purchasers for the target article.

With the prior approach of providing samples for readers of magazines and purchasers of other articles on the assumption that the readers and purchasers are overlapped with a group of potential purchasers for a target article, however, it is not possible to grasp in detail the attributes of the purchasers of magazines and other articles.

In addition, the overlap between the purchasers is presumed only based on the past sales results of similar articles and the like. Therefore, the accuracy of targeting is limited.

By comparison, with the prior-art technique in which the target for which samples are to be provided is determined based on attribute information included in personal information registered with a database, the attributes of each of the registered persons can be grasped in detail, thereby enabling targeting with a high accuracy. In this technique, however, the personal information is registered with the database, and therefore, consumers to be registered are apt to be negative in the registration with the database in fear that their registered personal information may be stolen or leaked. In such cases, the object of stimulating consumers' appetite for articles is not satisfied even though the accuracy of targeting is high, since the number of persons to whom samples are to be provided decreases.

In addition to the case of distributing samples, the same problems as described above are also caused in providing various services and information.

SUMMARY OF THE INVENTION

The invention provides a system and a method capable of registering personal information with a database while securing anonymity of a person and providing services and information for the person. The invention also is able to distribute samples based on high-accuracy targeting, thereby contributing to promotion of consumers' appetite for purchase of their desired articles.

The invention, in one embodiment, is realized as a service provision system provided with a server and a terminal device connected to the server via a network. The server constituting the service provision system is provided with: member information management mechanism (means) for managing identification information and attribute information about members; and service information management mechanism (means) for managing service information set in association with the attribute information about the members and kinds of articles. The terminal device is provided with: purchase information input mechanism (means) for inputting purchase information about an article; and member identification information input mechanism (means) for inputting identification information about a member. In response to purchases of a particular article by the member, the terminal device inputs purchase information about the article and identification information about the member with the purchase information input mechanism (means) and the member identification information input mechanism (means) to send the information to the server. In response, the server identifies the attribute information about the member corresponding to the received identification using the received identification information and the identification information managed by the member information management mechanism (means), identifies the service information managed by the service information management mechanism (means) using the identified attribute information and article information included in the received purchase information and sends the service information to the terminal device.

In this service provision system, when a member purchases a particular article, the terminal device inputs identification information about the member with the member identification information input mechanism (means) to send it to the server. Then, the server, using the member identification information managed by the member information management mechanism (means), identifies attribute information about the member corresponding to the identification information, identifies service information corresponding to the attribute information among the service information managed by the service information management mechanism (means) and sends it to the terminal device. In response, the terminal device checks the purchase information about the article inputted by the purchase information input mechanism (means) against the service information returned from the sever to identify a service to be provided for the member.

In this case, in the service provision system, information about samples to be provided for the member can be acquired as service information managed by the service information management mechanism (means). In this case, the terminal device outputs information indicating a sample to be distributed to the member who has purchased the particular article based on the sample information returned from the server.

The server can be configured to be further provided with: application storage mechanism (means) storing an application program for management of members; and application program sending control mechanism (means) for giving a unique ID to the application program stored in the application storage mechanism (means) and sending the application program to a particular information processor. In this case, the terminal device inputs the ID of the application program via the member identification information input mechanism (means) to send the ID to the server. Meanwhile, the member information management mechanism (means) of the server manages the ID given to the application program by the application program sending control mechanism (means) as authentication information about a member who is the user of the information processor, and, when receiving the ID from the terminal device, performs authentication using the ID.

Furthermore, the service information management mechanism (means) of the server manages data files available in the application program as the service information, and the terminal device sends a data file, service information, which has been returned from the server to the information processor which acquired the ID.

In one embodiment, the terminal device in the service provision system is configured to further comprise a questionnaire storage mechanism (means) storing questionnaire forms created according to the kinds of the service information to be provided for the members. The server sends information identifying a questionnaire form to be distributed to a particular member together with the service information, to the terminal device, and the terminal device distributes a questionnaire form identified by the information to the member (his information processing terminal).

Another aspect of the invention is realized as a server configured as described below. That is, the server is provided with: sending/receiving mechanism (means) for sending/receiving data to/from other information processors via a network; application storage mechanism (means) storing an application program for management of members; application program sending control mechanism (means) for giving a unique ID to the application program stored in the application storage mechanism (means) and controlling the sending/receiving mechanism (means) to send the application program to a particular information processor; member information management mechanism (means) for managing the ID given to the application program by the application program sending control mechanism (means) as authentication information about a member who is the user of the information processor; and service information management mechanism (means) for managing service information to be provided for particular members in association with information about the member to be provided with the services. In response to a receipt of the ID of the application program from a particular information processor, the member information management mechanism (means) performs authentication using the In, and the service information management mechanism (means) identifies service information to be provided for a member identified by the authenticated ID and sends it to the information processor which sent the ID.

Another aspect of the invention is realized as a terminal device for inputting purchase information about articles in a POS system and the like. The terminal device is provided with: purchase information input mechanism (means) for inputting purchase information; and member identification information input mechanism (means) for inputting member identification information identifying a member who purchases the article; service information acquisition mechanism (means) for acquiring service information associated with the member identification information inputted by the member identification information input mechanism (means), from a server; and service identifying mechanism (means) for identifying a service to be provided for the member by checking the purchase information inputted by the purchase information input mechanism (means) and the service information acquired by the service information acquisition mechanism (means).

Furthermore, the invention is also realized as a service provision method for providing a service for a member using a computer as described below. That is, in the service provision method, a unique ID is given to an application program for management of members and sent to a particular information processor; the ID is stored in a predetermined storage mechanism (means); and the ID is managed as authentication information about a member who is the user of the information processor. In response to purchases of a particular article by the member, the ID of the application program is inputted from the information processor carried by the member and purchase information about the article purchased by the member is inputted. Then, the member is authenticated with the inputted ID, and the attribute information about the member is identified based on the authenticated ID. Then, by checking the purchase information, the identified attribute information and service information set in association with the attribute information about the member and the kinds of articles and stored in a predetermined storage mechanism (means), service information to be provided for the member is identified.

Furthermore, the invention is realized as a program for controlling a computer to function as the server and the terminal device described above or a program for causing a computer to execute processing corresponding to each step of the service provision method described above. The program can be provided by distributing it in a magnetic disk, an optical disk, a semiconductor memory or other recording media or delivering it via a network.

BRIEF DESCRIPTION OF THE DRAWINGS

FIG. 7 shows an example of a targeting definition table used according to the invention;

DETAILED DESCRIPTION OF THE EMBODIMENTS

According to the invention, an application program for members with a unique ID attached thereto is downloaded to a mobile information terminal (information processor) carried by a member and the member is identified and authenticated with the ID of the application program. Accordingly, it is possible to register personal information about the member with a database and provide a service and information while securing his anonymity and provide a service or information for the particular person. Furthermore, according to the invention, it is possible to distribute samples or provide other services with high-accuracy targeting detailedly set based on attributes of a member and the kinds of an article the member has purchased, thereby considerably contributing to promotion of consumers' appetite for purchase of articles.

The embodiments of the invention further realizes a system for registering members while securing their anonymity to manage personal information about the registered member as well as providing detailed services according to attributes of each member, based on the information about the registered members personal information. In this embodiment, description will be made on a case where provision of samples is performed as a service for the members, as an example.

Figure 1:
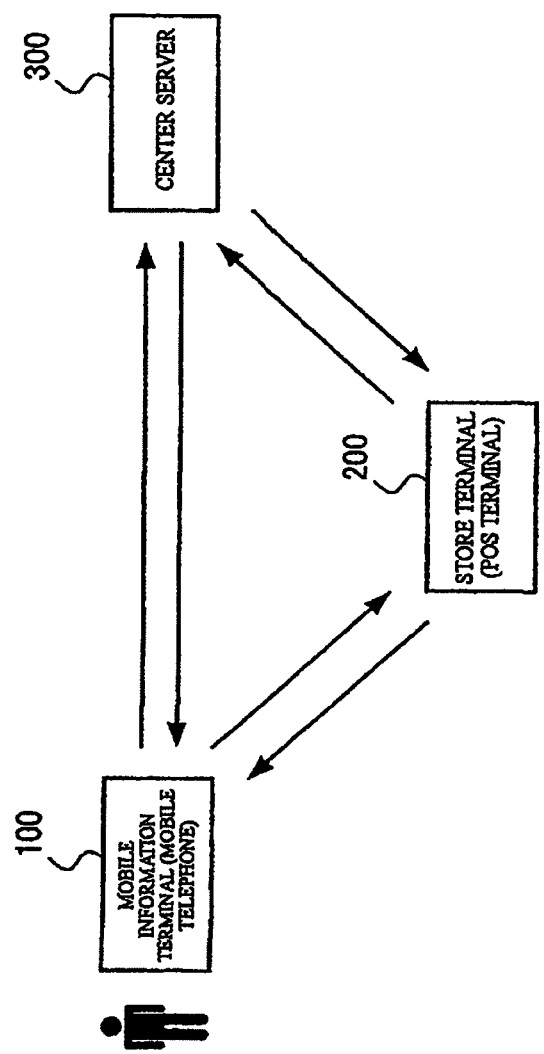
FIG. 1 shows the entire configuration of the service provision system according to the invention.

FIG. 1 shows the entire configuration of a service provision system according to this embodiment. As shown in FIG. 1, the service provision system of this embodiment comprises a mobile information terminal 100 carried by a registered member, a store terminal 200 to be used for providing services for the registered member, and a center server 300 for managing the personal information about the registered member.

The mobile information terminal 100 is a mobile information processor, such as a mobile telephone, a PDA (personal digital assistant) and a notebook computer, which can be carried. In this embodiment, the description below is based on the assumption that a mobile telephone is used as the mobile information terminal 100.

The store terminal 200 is realized with a personal computer, a workstation or other computers and installed in a store where articles or services are provided. In this embodiment, description will be made on the assumption that a terminal device (POS terminal) of a POS (point-of-sales) system is used as the store terminal 200.

The center server 300 is realized with a personal computer, a workstation or other computers and installed in a predetermined management center.

The mobile information terminal 100, the store terminal 200 and the center server 300 are connected via a wired or wireless network. Any network line can be used based on services to be provided or on the operation form, such as a public network including the Internet and a dedicated line. Communication between the mobile information terminal 100 and the store terminal 200 can be performed via various communication means. In this embodiment, infrared communication in compliance with IrDA (Infrared Data Association) standard is used.

Figure 2:
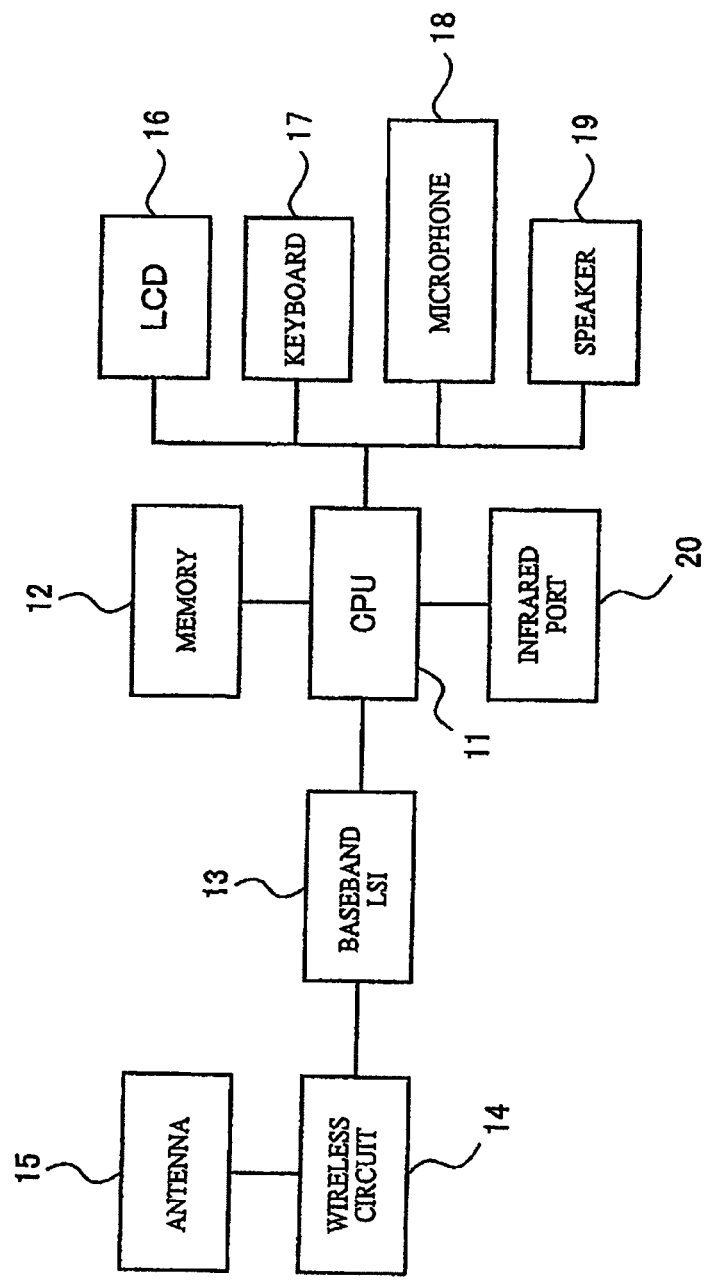
FIG. 2 shows a typical example of the hardware configuration of a mobile information terminal preferable for realizing the mobile information terminal according to the invention.

FIG. 2 shows a typical example of the hardware configuration of a mobile telephone preferred for realizing the mobile information terminal 100. The mobile telephone shown in FIG. 2 comprises a CPU (central processing unit) 11 which is operation means, memory 12 which is storage means, a baseband LSI 13 for performing signal processing, a wireless circuit 14 and an antenna 15 for performing wireless communication via a base station, an LCD (liquid crystal display) 16 which is input/output means to be controlled by the CPU 11, a keyboard 17, a microphone 18, a speaker 19, and a infrared port 20 for performing infrared communication with the store terminal 200.

FIG. 2 only illustrates an example of the hardware configuration of a mobile telephone realizing this embodiment, and various other configurations are also possible only if this embodiment can be applied thereto. For example, it is also possible to mount a CCD image sensor.

Figure 3:
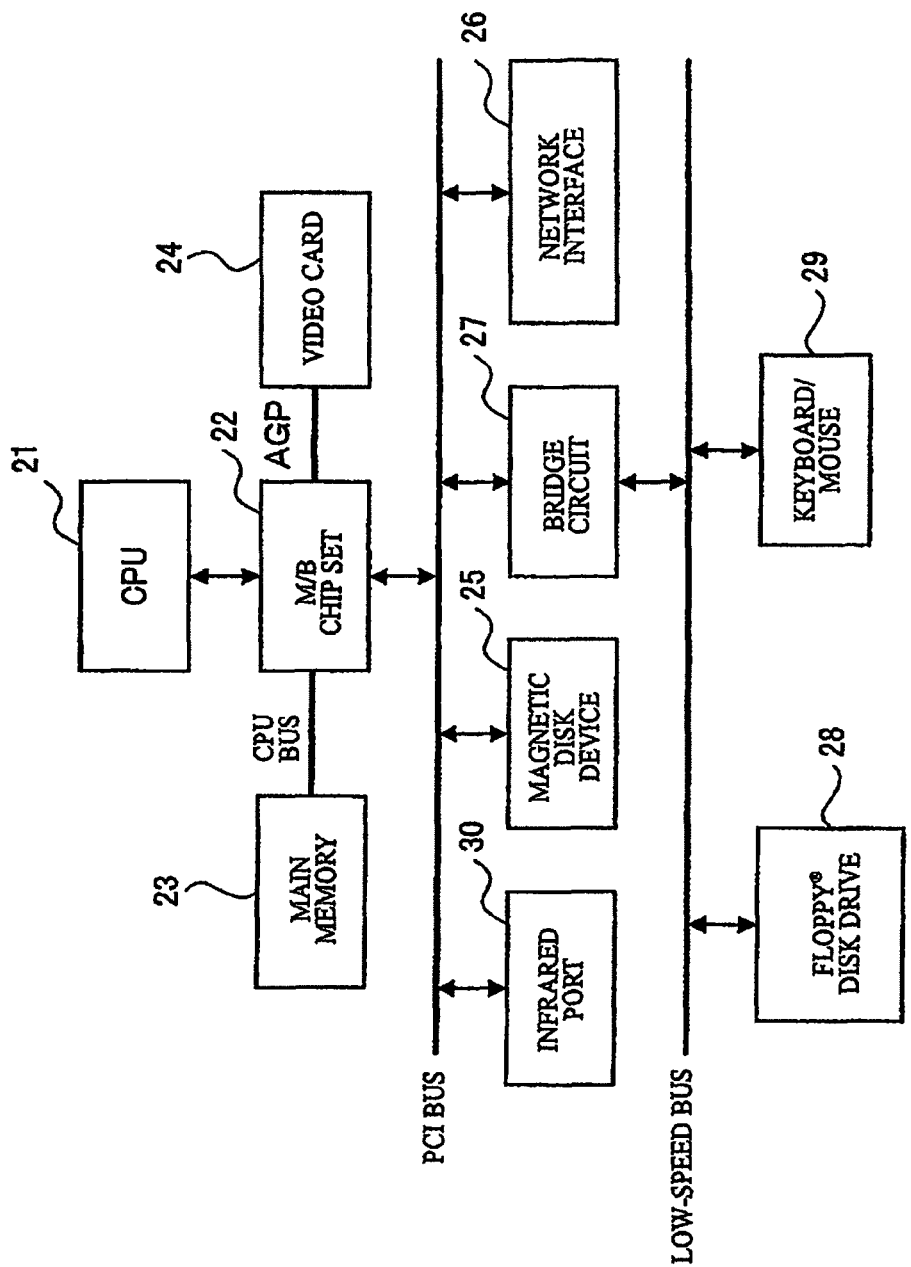
FIG. 3 shows a typical example of the hardware configuration of a computer for realizing the store terminal and the center server according to the invention.

FIG. 3 shows a typical example of the hardware configuration of a computer preferable for realizing the store terminal 200 and the center server 300. The computer shown in FIG. 3 comprises a CPU (central processing unit) 21 which is operation means, a main memory 23 connected to the CPU 21 via an M/B (mother board) chip set 22 and a CPU bus, a video card 24 which is also connected to the CPU 21 via the M/B chip set 22 and an AGP (accelerated graphics port); a magnetic disk device (HDD) 25 connected to the M/B chip set 22 via a PCI (peripheral component interconnect) bus, a network interface 26, a infrared port 30 for performing infrared communication with other equipment, and a floppy (TM) disk drive 28 and a keyboard/mouse 29 connected to the M/B chip set 22 via a bridge circuit 27 and a low-speed bus such as an ISA (industry standard architecture) bus from the PCI bus.

FIG. 3 only illustrates an example of the hardware configuration of a computer realizing this embodiment, and various other configurations are possible only if this embodiment can be applied thereto. For example, it is also possible to mount only a video memory instead of providing a video card 24 so that image data is processed by the CPU 21. It is also possible to provide drives such as a CD-R (compact disc recordable) and a DVD-RAM (digital versatile disc random access memory) via interfaces such as an ATA (AT attachment) and a SCSI (small computer system interface), as external storage devices. In the case where the store terminal 200 is realized with) a POS terminal, there is provided an input device such as bar code reader for inputting purchase information. Since the center server 300 is connected to other equipment via a regular network line as described above, the infrared port 30 is not necessarily required for the configuration of the center server 300. Furthermore, in the case where the mobile information terminal 100 is realized with a notebook computer and the like, the configuration will be such shown in FIG. 3.

In this embodiment, the user of the mobile information terminal 100 is registered as a member, and the personal information about the registered member is managed by the center server 300. The member registration is performed by the mobile information terminal 100 downloading an application program for management of members (hereinafter referred to as a member application) from the center server 300. An individually unique ID (hereinafter referred to as an application ID) is given to the member application. In the system of this embodiment, the application ID is checked to identify the member each time a service for members is provided. Therefore, the user of the mobile information terminal 100 is not required to send personal information (personal identification information) identifying the user himself, such as the name and the address, to the center server 300 or the store terminal 200 even when performing the member registration or receiving a service. That is, the anonymity of the member can be secured.

The member application can be in any form operative on the mobile information terminal 100, and in this embodiment, it is assumed to be realized with a Java® (U.S. Sun Microsystems, Inc.) application which is available on a lot of information terminals such as a mobile telephone. The member application controls management of the personal information to be registered with the center server 300, by the mobile information terminal 100, and processing for sending and receiving information required for a service, which will be described in detail later.

Figure 4:
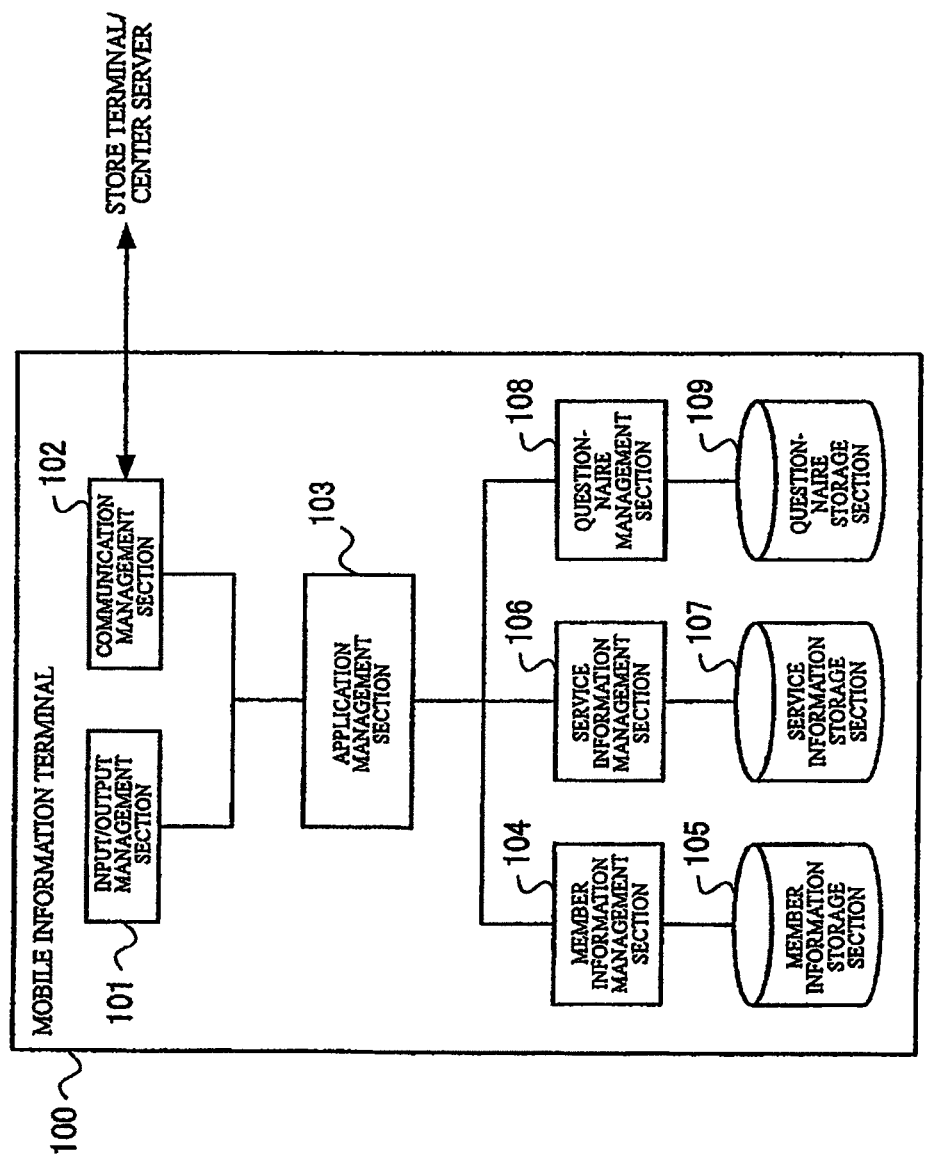
FIG. 4 shows the functional configuration of the mobile information terminal according to the invention.

FIG. 4 shows the functional configuration of the mobile information terminal 100. As shown in FIG. 4, the mobile information terminal 100 comprises an input/output management section 101, a communication management section 102, an application management section 103, a member information management section 104 and a member information storage section 105 as member information management means, a service information management section 106 and a service information storage section 107 as service information management means, and a questionnaire management section 108 and a questionnaire storage section 109 as questionnaire management means.

The service information may be various information prepared for providing services for the members and include various data files to be electronically handled, such as article information, discount information and other sales information, and digital contents using animations and voices. As for sample information, which is to be described later, the sample itself which is to be provided for members is not a data file. However, since the information instructing which sample is to be provided for which member is treated as a data file, and therefore, the sample can be regarded as a form of service information.

In the configuration shown in FIG. 4, the input/output management section 101, the communication management section 102, the application management section 103, the member information management section 104, the service information management section 106 and the questionnaire management section 108 are virtual functional blocks realized, for example, by the program-controlled CPU 11 shown in FIG. 2. The member information storage section 105, the service information storage section 107 and the questionnaire storage section 109 are realized, for example, by the memory 12 in FIG. 2.

The input/output management section 101 and the communication management section 102 can utilize the functions originally provided for the mobile telephone to perform an ordinary telephone call or data communication. Meanwhile, the application management section 103, the member information management section 104, the service information management section 106 and the questionnaire management section 108 are functions to be realized by the member application downloaded from the center server 300.

The input/output management section 101 manages input and output such as display output by the LCD 16, input via the keyboard 17, voice input via the microphone 18 and voice output via the speaker 19 in FIG. 2.

The communication management section 102 manages the wireless circuit 14 in FIG. 2 to manage communication (telephone calls and data communication) via the mobile telephone communication network. It also manages the infrared port 20 to manage infrared communication to be performed with the store terminal 200. The application management section 103 performs overall control of various functions realized by the member application.

The member information storage section 105 stores the member information about the registered member who is the user of the mobile information terminal 100, and the member information management section 104 executes processing such as registration, update and deletion of the member information. In this embodiment, the mobile information terminal 100 (or the user thereof) is identified by the application ID given to the member application which the mobile information terminal 100 has downloaded and uses, as described above. Accordingly, the member information handled in this case does not include persona information such as the name and the address but includes information on personal attributes (personal attribute information) such as interests, preferences, age, sex and occupation. Specific contents of the personal attribute information (that is, what should be used as the personal attribute information) can be arbitrarily defined. It is not necessary to set all the items of the member information as essential registration items.

The member information (personal attribute information) is inputted with the input means such as the keyboard 17 shown in FIG. 2. The inputted member information is stored in the member information storage section 105 and is also sent to the center server 300. The application ID is also stored in the member information storage section 105 in addition to the member information. In the case where points are added upon purchase of articles and the like and services are provided according to the accumulated points, point information is also stored in the member information storage section 105.

The service information storage section 107 stores service information sent from the store terminal 200 or the center server 300, and the service information management section 106 performs registration, update and deletion of the service information. The service information includes article information, digital contents (such as animations and music), and the like.

The questionnaire storage section 109 stores an answer form for questionnaire on a sample (hereinafter referred to as a questionnaire form) sent from the store terminal 200, and the questionnaire management section 108 performs input to and update and deletion of the questionnaire form.

The answer into the questionnaire form is inputted with the input means such as the keyboard 17 shown in FIG. 2, and the inputted answer is stored in the questionnaire storage section 109 and sent to the center server 300.

Figure 5:
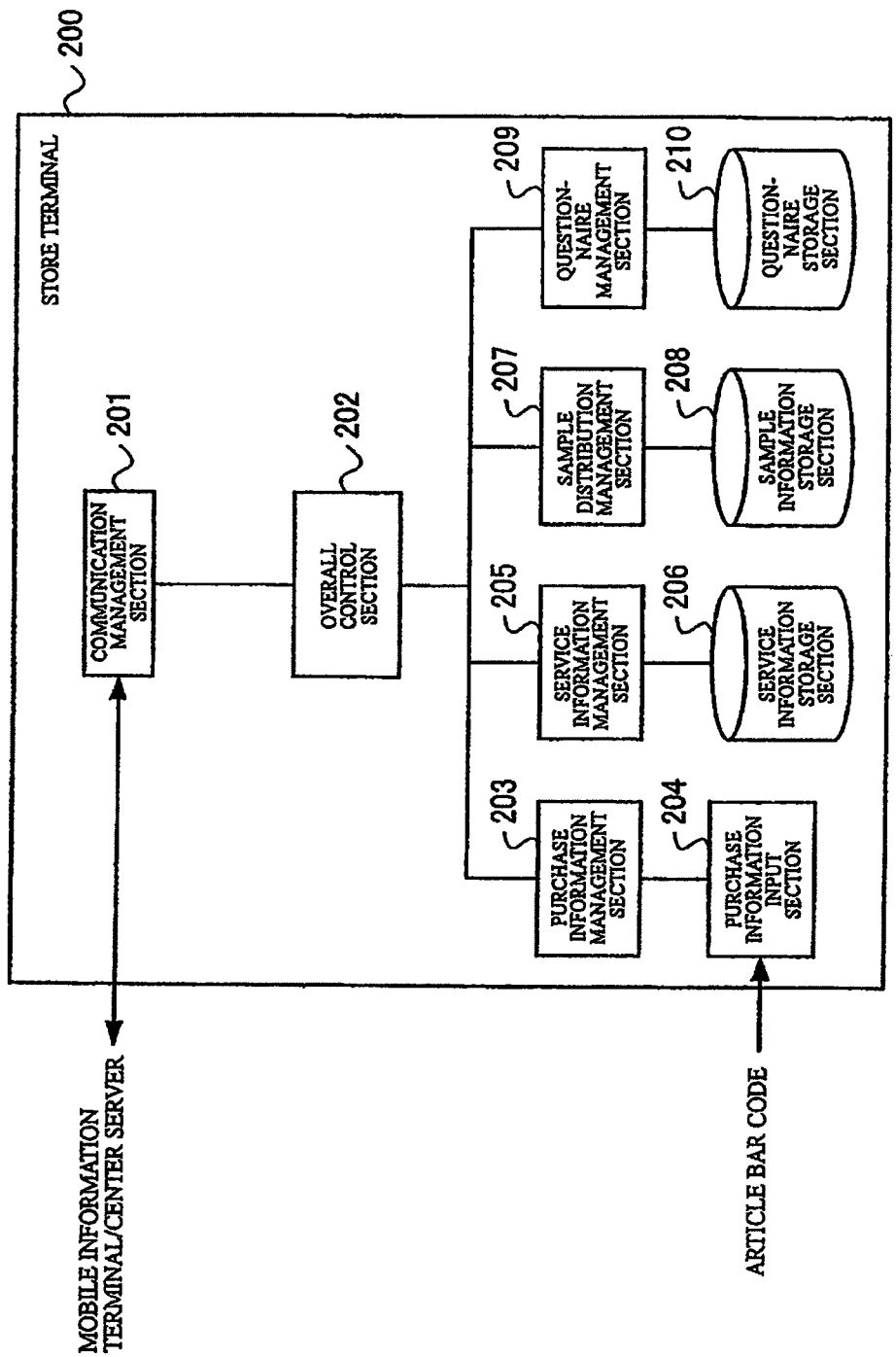
FIG. 5 shows the functional configuration of the store terminal according to the invention.

FIG. 5 shows the functional configuration of the store terminal 200. As shown in FIG. 5, the store terminal 200 comprises a communication management section 201, an overall control section 202, a purchase information management section 203, a purchase information input section 204, a service information management section 205 and a service information storage section 206 as service information management means, a sample distribution management section 207 and a sample information storage section 208 as sample information management means, and a questionnaire management section 209 and a questionnaire storage section 210 as questionnaire management means.

In the configuration shown in FIG. 5, the communication management section 201, the overall control section 202, the service information management section 205, the sample distribution management section 207 and the questionnaire management section 209 are virtual functional blocks realized, for example, with the program-controlled CPU 21 shown in FIG. 3. The purchase information management section 203, the service information storage section 206, the sample information storage section 208 and the questionnaire storage section 210 are realized, for example, with the main memory 23 and the magnetic disk device 25 shown in FIG. 3. The purchase information input section 204 is realized with the CPU 11 shown in FIG. 2 and input means such as a bar-code reader and a keyboard.

The communication management section 201, the purchase information management section 203 and the purchase information input section 204 can utilize the functions originally provided for the POS terminal in order to perform the ordinary purchase information collection job of the POS terminal. The communication management section 201 manages communication with the center server 300 via the network interface 26 in FIG. 3 and controls the infrared port 30 to manage infrared communication to be performed with the mobile information terminal 100. The overall control section 202 performs overall control of the various functions of the store terminal 200.

The purchase information input section 204 inputs purchase information attached to an article by reading a bar code or performing input to a keyboard. The purchase information management section 203 calculates the amount and the points to be added based on the purchase information inputted by the purchase information input section 204, and sends the purchase information to the center server 300. The service information storage section 206 stores information to be provided for the members as services (service information), and the service information management section 205 performs registration, update, deletion and sending/receiving of the service information. The service information is sent from the center server 300 and stored in the service information storage section 206, and then sent to the mobile information terminal 100 of the member is to be provided with the service information via infrared communication.

The sample information storage section 208 stores information about samples distributed to the members (the kinds, the quantity of stock and the like of the samples), and the sample distribution management section 207 performs registration, update and deletion of the sample information. It also determines whether to delivery a sample or not, which sample to be delivered and the like in response to access from a particular mobile information terminal 100. The sample information is sent from the center server 300 and stored in the sample information storage section 208.

The questionnaire storage section 210 stores a questionnaire form for each sample sent from the center server 300, and the questionnaire management section 209 performs registration, update, deletion and sending/receiving of the questionnaire form. The questionnaire form is sent from the center server 300 and stored in the questionnaire storage section 210, and then sent to the mobile information terminal 100 of the member to whom the sample has been delivered, via infrared communication. The questionnaire management section 209 can also receive an answer to the questionnaire, sent from the mobile information terminal 100, and once store it in the questionnaire storage section 210 to relay and send it to the center server 300.

Figure 6:
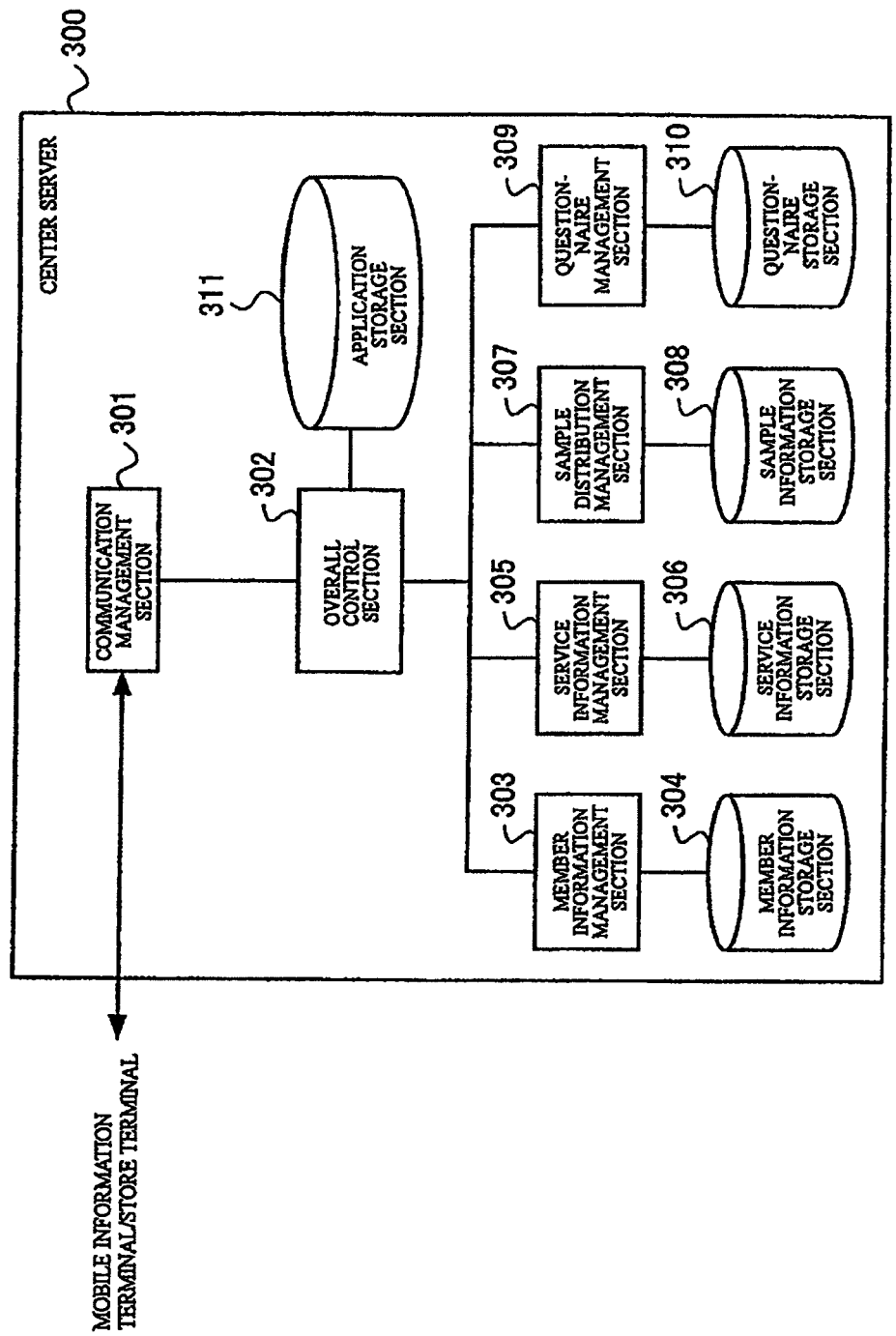
FIG. 6 shows the functional configuration of the center server according to the invention.

FIG. 6 shows the functional configuration of the center server 300. As shown in FIG. 6, the center server 300 comprises a communication management section 301, an overall control section 302, a member information management section 303 and a member information storage section 304 as member information management means, a service information management section 305 and a service information storage section 306 as service information management means, a sample distribution management section 307 and a sample information storage section 308 as sample information management means, and a questionnaire management section 309 and a questionnaire storage section 310 and an application storage section 311 as questionnaire management means.

In the configuration shown in FIG. 6, the communication management section 301, the overall control section 302, the member information management section 303, the service information management section 305, the sample distribution management section 307 and the questionnaire management section 309 are virtual functional blocks realized, for example, by the program-controlled CPU 21 shown in FIG. 3. The member information storage section 304, the service information storage section 306, the sample information storage section 308, the questionnaire storage section 310 and the application storage section 311 are realized, for example, by the main memory 23 or the magnetic disk device 25 in FIG. 3.

The communication management section 301 manages communication to be performed with the store terminal 200 and the mobile information terminal 100, via the network interface 26 in FIG. 3. The overall control section 302 performs overall control of the various functions of the center server 300.

The member information storage section 304 stores the member information about each registered member and the application ID of the member application downloaded by the mobile information terminal 100 of each registered member in association with each other. The member information management section 303 utilizes the application ID to perform member authentication and registration, update and deletion of the member information. The application ID to be acquired is that given to the member application downloaded to the mobile information terminal 100 (or which is given when the member application is downloaded). The member information sent from the mobile information terminal 100 when the member application is downloaded, for example, is received and acquired. It is assumed that the member information can be updated in response to sending from the mobile information terminal 100.

The service information storage section 306 stores service information to be provided for the members, and the service information management section 305 performs registration, update and deletion of the service information and information editing suitable for each member. The contents of the service information are set according to the personal attributes of each member, based on the member information stored in the member information storage section 304 for each member. The contents may be information on articles which will interest the members with particular interests, or digital contents such as animations for the case where such digital contents are provided according to the points accumulated by the members.

The sample information storage section 308 stores information about samples to be distributed to the members, and the sample distribution management section 307 performs registration, update and deletion of the sample information. There is stored a targeting definition table defining which sample to be provided to which members with which attributes, in the sample information storage section 308. The sample distribution management section 307 can also use the targeting definition table to determine whether to distribute samples to particular members, which sample to be distribute and the like, on behalf of the sample distribution management section 207 of the store terminal 200.

FIG. 7 shows an example of the targeting definition table. In the targeting definition table shown in FIG. 7, in the case of distributing samples by attaching them to magazines and other articles, the attributes assumed for purchases of the magazines and articles to which the sample is attached and the attributes of the members in the member information are set as the classification items. This makes it possible to define in detail which samples are to be provided for which members with which attributes who have purchased which articles.

In the illustrated example, the items (sex, age and occupation) of the attribute information about the member are vertically set, and the items of purchased articles are horizontally set. The position at which any selected two items cross each other (that is, members with the selected attribute who purchased the selected item) can be considered as a target. In the illustrated example, the members with the attributes of {sex: female; age group: 20 to 24, or 25 to 29; occupation: office worker} who purchased the article A or the article B (the areas shown in gray) are targeted, and it is defined that a sample of a new brand lipstick should be distributed to the members. Similarly, the members with the attributes {sex: female; age group: 20 to 24; occupation: housewife} who purchased the article C or the article D (the areas marked with diagonal lines) are targeted, and it is defined that a sample of detergent produced from new natural material should be distributed to the members.

In the case where a sample is simply attached to an article as has been done conventionally, the sample is provided for a consumer who has purchased a particular article irrespective of the consumer's attributes, and thereby the targeting accuracy is limited. The same goes for the case where the target to be provided with a sample is identified only based on the attributes of registered members. The areas surrounded by bold lines in FIG. 7 show an example of a target selected by such a prior-art approach.

In contrast, in this embodiment, the target to be provided with a sample is defined in detail based on the attributes of members and the purchased articles as described above, thereby enhancing the targeting accuracy. The questionnaire storage section 310 stores a questionnaire form for each sample, and the questionnaire management section 309 performs registration, update, deletion and sending/receiving of the questionnaire form and the answer(s) to the questionnaire.

The application storage section 311 stores a member application. The member application is read by the overall control section 302 which functions as application program sending control means in response to a download request from the mobile information terminal 100 and sent to the mobile information terminal 100. A unique application ID is given by the overall control section 302 then. The application ID is stored in the member information storage section 304 as described above and used as authentication information about the mobile information terminal 100 (or the user thereof).

Figure 8:
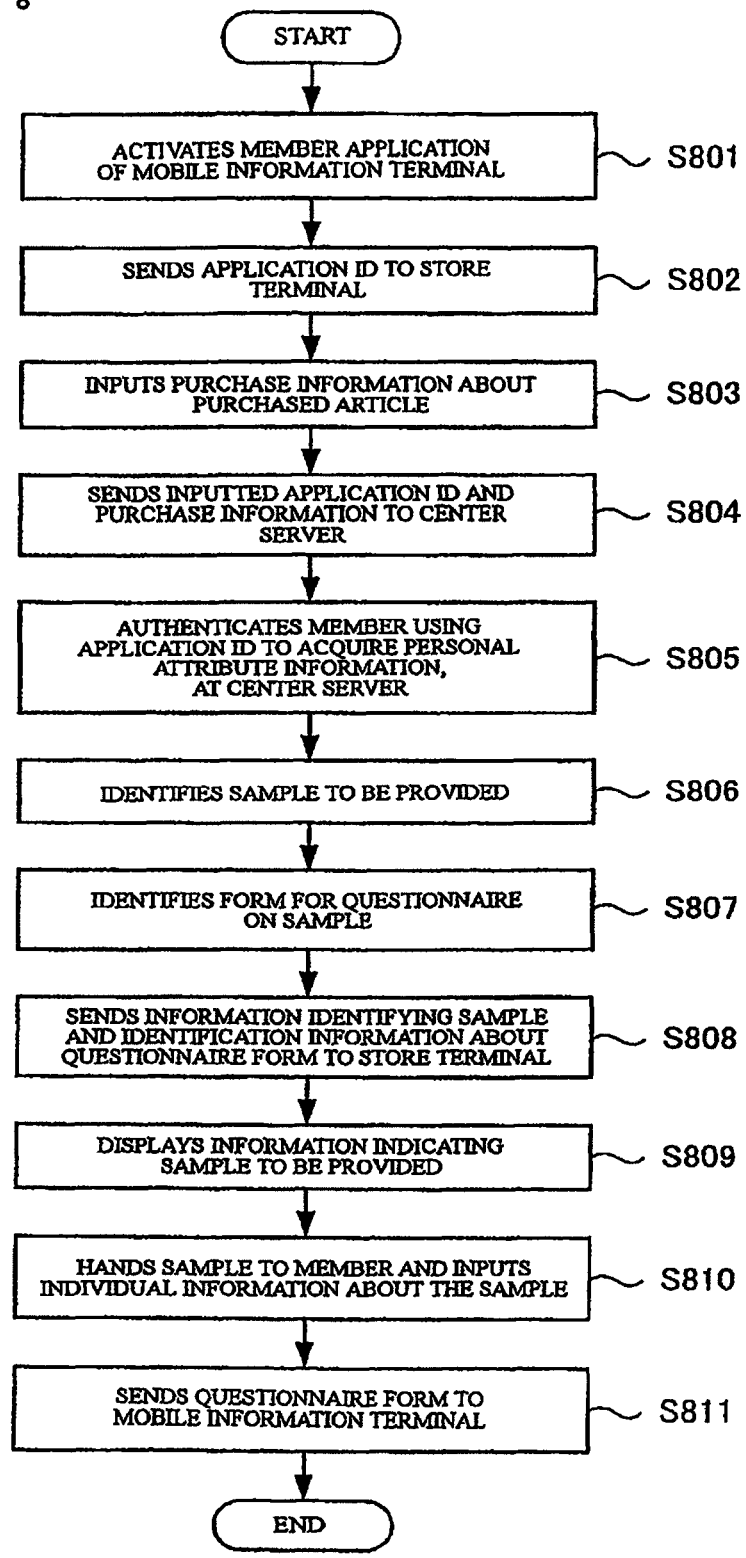
FIG. 8 is a flowchart showing an overall flow of information processing to be performed in the system according to the invention when a sample is provided for a member.

A service provision method according to this embodiment will be now described for the case where samples suitable for individual members are provided as a service for the members. As preprocessing, it is determined, in response to a request by a company selling a particular article, to provide a particular sample for members with particular attributes, and a targeting definition table as shown in FIG. 7 and information such as the number of samples to be distributed are stored in the sample information storage section 308 of the center server 300. In the case where the sample distribution results are investigated, a questionnaire on the sample is prepared, and then the questionnaire form is delivered to the store terminal 200 and stored in the questionnaire storage section 210. Identification information identifying the questionnaire form and the sample are associated with each other, and the association information is stored in the questionnaire storage section 310 of the center server 300. The samples to the distributed are then prepared at each store FIG. 8 is a flowchart showing a overall flow of information processing to be performed in the system of this embodiment when a sample is provided for a member. Referring to FIG. 8, a consumer who is a member activates a member application on his mobile information terminal 100 when purchasing a desired article at a store (step 801). The application management section 103 then sends an application ID to the store terminal 200 through infrared communication via the communication management section 102 (step 802). The application ID sent from the mobile information terminal 100 is received at the communication management section 201 of the store terminal 200. That is, the communication management section 201 and the infrared port 30 shown in FIG. 3 function as means for inputting the application ID, information identifying the member.

A salesperson operates the purchase information input section 204 (such as reading of the bar code) of the store terminal 200, a POS terminal, to input purchase information about the purchased article (step 803). The purchase information is sent to the center server 300 together with the application ID received at step 802, via the communication management section 201 (step 804).

Separately from the processing according to this embodiment, the purchase information inputted at step 803 is utilized by the purchase information management section 203 for performing ordinary POS-system processing (amount calculation, point calculation, acquisition of information on sales results and the like).

When the center server 300 receives the application ID and the purchase information about the article from the store terminal 200 via the communication management section 301, the member information management section 303 uses the application ID to authenticate the member and reads the member information (personal attribute information) about the authenticated member from the member information storage section 304 (step 805). The sample distribution management section 307 then checks the member information read at step 805 against the targeting definition table to see if there is any sample to be provided for the member. If there is any sample to be provided, the kind of the sample is identified (step 806).

Furthermore, the questionnaire management section 309 checks to see if there is a questionnaire for the sample identified at step 806. If there is a questionnaire, the questionnaire management section 309 reads identification information identifying the questionnaire form from the questionnaire storage section 310 (step 807). The overall control section 302 then sends the information identifying the sample and the information identifying the questionnaire form to the store terminal 200 via the communication management section 301 (step 808).

When the store terminal 200 receives the information sent from the center server 300 via the communication management section 201, the overall control section 202 displays information (the identification information or the name) indicating the sample to be provided based on the received information (step 809). The salesperson refers to the display to hand an appropriate sample to the consumer who is the member. When handing the sample, the salesperson inputs individual information about the sample (for example, reads the bar code attached to the sample) (step 810). By collecting such inputted individual sample information, the sample distribution results can be managed.

When the store terminal 200 receives information identifying a questionnaire together with the information identifying a sample, the questionnaire management section 209 reads the questionnaire form indicated by the identification information, that is, a questionnaire form corresponding to the sample to be provided, from the questionnaire storage section 210 and sends it to the mobile information terminal 100 through infrared communication via the communication management section 201 (step 811). This questionnaire form is received by the communication management section 102 of the mobile information terminal 100 and stored, in the questionnaire storage section 109 by the questionnaire management section 108.

The member can display the received questionnaire form with the display means (the LCD 16 in FIG. 2) of the mobile information terminal 100, input the answer and then returns it to the store terminal 200 or the center server 300. When the answer is returned to the store terminal 200, it is once stored in the questionnaire storage section 210 of the store terminal 200, and then transferred to the center server 300. In order to return the answer to the store terminal 200, the infrared communication used for sending the application ID and receiving the questionnaire form can be used. In order to return it directly to the center server 300, data communication via a mobile telephone communication network can be utilized. Even when the mobile information terminal 100 is any information processor other than a mobile telephone, it is also possible to configure the processor so that it can send the questionnaire answer directly to the center server 300 via various communication forms available thereto. By performing questionnaire for a sample, collecting answers to the questionnaire, and compiling and analyzing the answers as described above, it is possible to obtain the consumers' reactions on and impressions of the sample and thereby reflect them to the sales strategy for the article.

Figure 9:
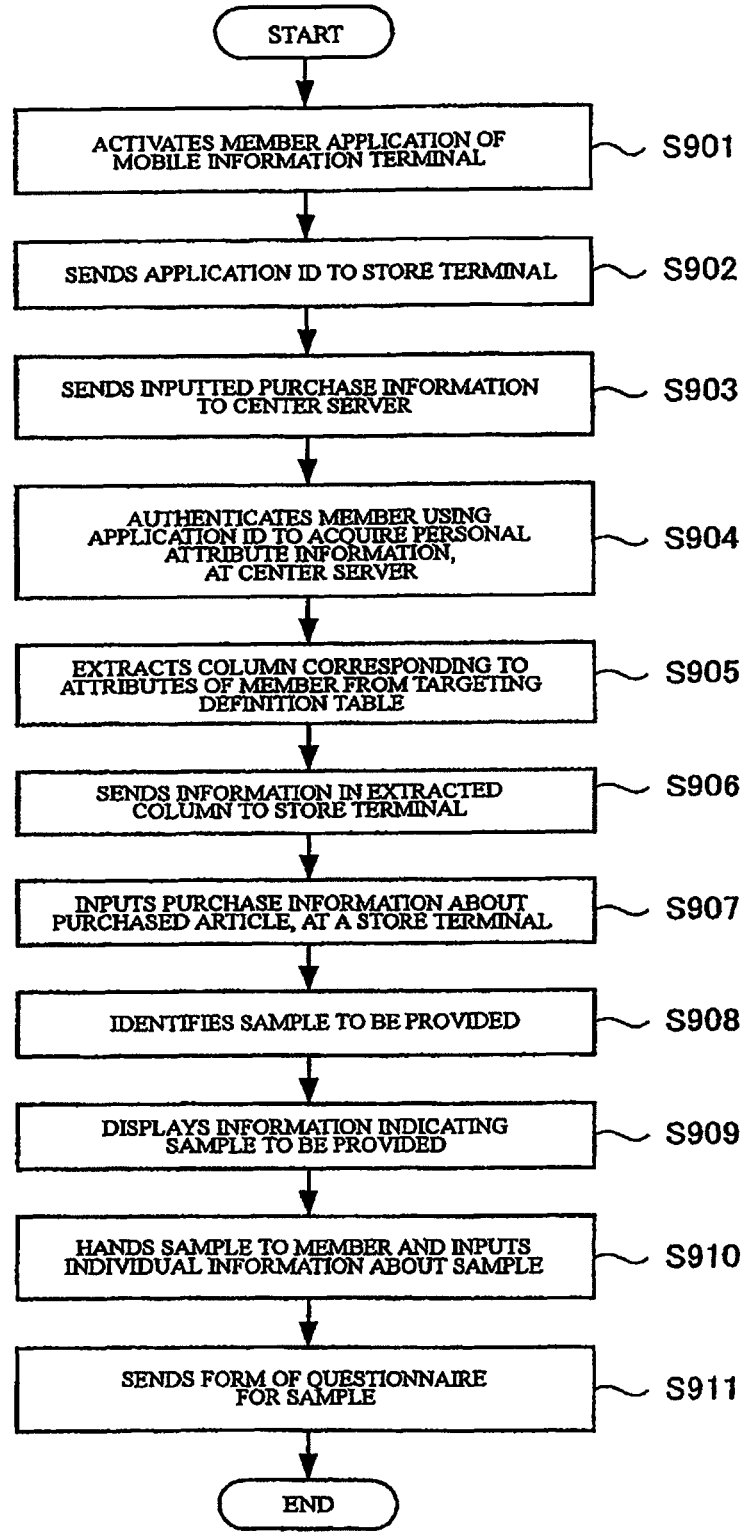
FIG. 9 is a flowchart showing another example of information processing to be performed in the system according to the invention.

In the operation example shown in FIG. 8, the application ID and the purchase information about the article are inputted at the store terminal 200 and sent to the center server 300, and then a sample to be provided for the member is determined at the center server 300. However, according to this embodiment, it is also possible for the store terminal 200 to acquire necessary information from the center server 300 and determine a sample to be provided for the member. FIG. 9 is a flowchart showing the overall flow of information processing to be performed in a system of this embodiment in such a case.

In FIG. 9, the operations of activating a member application at the mobile information terminal 100 (step 901) and sending the application ID to the store terminal 200 (step 902) are similar to those performed at the steps 801 and 802 in FIG. 8. The store terminal 200 sends the application ID received at step 902 to the center server 300 (step 903), via the communication management section 201 (step 903).

When the center server 300 receives the application ID and the purchase information about the article from the store terminal 200 via the communication management section 301, the member information management section 303 uses the application ID to authenticate the member and reads the member information (personal attribute information) about the authenticated member from the member information storage section 304 (step 904). The sample distribution management section 307 then checks the member information read at step 904 against the targeting definition table, extracts a column in the targeting definition table corresponding to the attributes of the member (step 905) and sends the information of the extracted column to the store terminal 200 via the communication management section 301 (step 906). This information becomes a table defining which sample is to be provided according to articles purchased by the member identified by the application ID inputted at step 902. The sent information is stored in the sample information storage section 202 by the sample distribution management section 207 at the store terminal 200.

At the store terminal 200, the salesperson operates the purchase information input section 204 to input the purchase information about the purchased article (step 907) This purchase information is utilized for the ordinary POS-system processing and is checked by the sample distribution management section 207 against the column information in the targeting definition table stored in the sample distribution management section 207. Based on the checking, the sample distribution management section 207 identifies a sample to be provided for the member who is identified by the application ID inputted at step 902 and who has purchased an article indicated by the purchase information of step 907 (step 908). The overall control section 202 displays information indicating the sample to be provided on the display (step 909). The salesperson refers to the display to hand an appropriate sample to the consumer who is the member. When handing the sample, the salesperson inputs individual information about the sample in order to manage the sample distribution results (step 910).

The questionnaire management section 209 checks to see if there is a questionnaire for the sample identified at step 908. If there is a questionnaire, the questionnaire management section 209 reads a questionnaire form therefor from the questionnaire storage section 210, and sends it to the mobile information terminal 100 through infrared communication via the communication management section 201 (step 911). Collection and utilization of the questionnaire answers is as described above.

As described above, according to this embodiment, it is possible that management of members and determination of a service to be provided for a member are all performed by the center server 300 and only input of necessary information (application ID and purchase information) and output of a service to be provided for a member are performed by the store terminal 200 (in the case of FIG. 8), and it is also possible that determination of a service to be provided for a member is shared and executed by the center server 300 and the store terminal 200 (in the case of FIG. 9).

In the embodiment described above, explanation has been made on the case where samples suitable for individual members are distributed as a service for the members, it is also possible to provide other various services using the system for member registration, management and authentication, which secures anonymity of members, according to this embodiment. For example, digital contents such as animations and music can be provided according to the attributes of members, and article information (advertisement and other information for sales promotion) and discount information can be notified.

In this case, as preprocessing for providing a service, it is determined that a predetermined service (digital contents or information) is to be provided for members with particular attributes, and a target definition table as shown in FIG. 7 and information such as a service provision period are stored in the service information storage section 306 of the center server 300 for the sample. According to procedures similar to those shown in FIGS. 8 and 9, a service defined in the targeting definition table is provided for a member who has purchased a particular article based on the attributes of the member and the kind of the purchased article.

It has been described that, in the case of providing a sample, the information about the sample to be provided is displayed on the display on the store terminal 200 (refer to steps 809 and 909). In the case of providing digital contents or particular information, however, reproduction of digital contents or display output of information may be performed on the mobile information terminal 100 by providing the member application downloaded to the mobile information terminal 100 with functions of reproducing digital contents or displaying information.

In these services other than a sample, it is also possible to perform questionnaire to obtain consumers' reactions and impressions. The questionnaire can be performed in a way similar to those in FIGS. 8 and 9.

It is common that a POS system provides a service of adding points according to the purchase amount or the number of purchases by members and providing a giveaway or discounting according to the accumulated points. The points can be managed with the use of this embodiment.

In this case, though calculation and management of the points can be performed by the ordinary POS-terminal functions of the store terminal 200, the points may be stored in the member information storage section 304 of the center server 300 and managed as attribute information about members. It makes it possible to, when providing a sample or a service for a member, set a sample or a service to be provided according to the points.

After authentication with the application ID, the point information about the authenticated member can be sent to the mobile information terminal 100 via the store terminal 200 or directly from the center server 300. The member can display the point information received from the store terminal 200 or the center server 300 with the application management section 103 of the mobile information terminal 100 to check the current point.

Furthermore, by indicating the points with digital contents using a different image or a character according to the point, checking of the point information with the mobile information terminal 100 can be facilitated.

Furthermore, with the use of the member management system according to this embodiment, it is possible to deliver information to the mobile information terminal 100 not via the store terminal 200 but directly. In this case, the member application to be downloaded from the center server 300 is provided with a function of accessing the center server 300 to request sending of information. The application ID is directly sent to the center server 300 from the mobile information terminal 100 on which the member application operates to request authentication, and then information is received from the center server 300.

By enabling an activation condition, such as the time to access, to be set for the access function of the member application, the member application of the mobile information terminal 100 can be automatically activated and access the center server 300 to acquire information if the condition desired by the member such as a preset time is satisfied.

In this information delivery method, it is also possible to set information to be delivered according to the attributes of members managed by the center server 300. As for the information to be delivered and the attributes of the members to whom the information should be delivered, a correspondence table such as the targeting definition table shown in FIG. 7 is created and stored in the service information storage section 306.

The center server 300 accepts access from the mobile information terminal 100; the member information management section 303, after authenticating a member with the application ID, reads the member information (personal attribute information) of the identified member from the member information storage section 304; and the service information management section 305 reads information corresponding to the member information from the service information storage section 306 and returns it to the mobile information terminal 100.

The information delivery method as described above, in which the mobile information terminal 100 accesses the center server 300 to acquire information unlike a push-type information delivery from a server via e-mail, can be said to be a pull-type information delivery. According to this method, information is not sent one-sidedly from a server but is acquired by a member at his desired time. Furthermore, since information is received via a function provided by a member application, it is not required to disclose an e-mail address to the center server 300 and the information can be acquired while anonymity is secured.

These days, in the push-type information delivery method via e-mail, the rate of arrival of provided information at destination users has significantly decreased with increase in the number of users who set refusal of receiving e-mails sent from addresses such as "... co jp" and "... com". In contrast, according to the above-described pull-type information delivery method using this embodiment, information can be acquired at the user's convenience and anonymity can be secured when acquiring the information, so that feelings of resistance toward acquisition of information is reduced and information can be effectively delivered.

In this embodiment described above, explanation has been made on a case where a POS terminal is used as the store terminal 200, as an example. This is because, when providing a sample as a service, it is effective to send and receive information at the payment and then provide the service. However, the operation of sending an application ID to the store terminal 200 from the mobile information terminal 100 for authentication and the operation of acquiring various service information at the mobile information terminal 100 are not necessarily required to be performed at the payment. Accordingly, by installing a store terminal 200 (such as a kiosk terminal) configured separately from the POS terminal in the store, a member can communicate with the store terminal 200 from his mobile information terminal 100 in order to be authenticated prior to purchase of an article or to acquire service information to be provided according to points separately from purchasing an article.

On a shopping street or in a shopping mall, it is also possible to install a store terminal 200 outside a store so that a member can be authenticated via the store terminal 200 and enjoy a service such as provision of a sample when purchasing an article at any store on the shopping street.

It is also possible to install only an input/output device of a store terminal 200 at a suitable place, instead of installing a store terminal 200 such as a kiosk terminal inside or outside a store, so that a member himself can input his application ID to acquire a questionnaire form or service information. That is, an input/output device with an infrared port is installed at a predetermined place, and input and output of information with the input/output device is controlled by a store terminal 200 realized by a POS terminal and the like. As described later, in the case where an application ID is inputted via a bar code, it is also possible to install a bar code reader at a particular place so that input into the bar code reader is received by the communication management section 201 of a store terminal 200.

When only input is performed with an external device as in this case, a questionnaire form or service information is sent via data communication means such as a mobile telephone communication network or a wireless LAN (local area network) according to the kind of the mobile information terminal 100.

In this embodiment described above, communication means between the mobile information terminal 100 and the store terminal 200 is infrared communication. However, it goes without saying that information can be sent and received via other various means. For example, it is possible to input information into a store terminal 200 by displaying a bar code indicating an application ID or a coupon image indicating the points accumulated by a member on display means (the LCD 16 in FIG. 2) of a mobile information terminal 100 and causing it to be read by a bar code reader or an image sensor provided for the store terminal 200. It is also possible to send and receive data via data communication using a wireless communication technique such as Bluetooth (trademark owned by Bluetooth SIG, Inc. of United States). By using Bluetooth, it is also possible that, when a member carrying a mobile information terminal 100 enters a store (or coming up at a predetermined distance from a store terminal 200), an application ID is sent to the store terminal 200 from the mobile information terminal 100 in order to be authenticated.

While the invention has been described in terms of preferred embodiments, those skilled in the art will recognize that the invention can be practiced with modification within the spirit and scope of the appended claims.

What is claimed is:

1. A service provision system, comprising:
a server comprising a central processing unit (CPU) and a memory connected to the CPU for managing information about members;
a terminal device connected to the server via a network; and
a mobile information terminal;
the server comprising:
a member information management mechanism configured to manage identification information and attribute information about the members, wherein the attribute information includes points accumulated from purchases of articles by the members; and
a service information management mechanism configured to manage service information set in association with the attribute information about the members and kinds of articles; and
the terminal device comprising:
a purchase information input mechanism configured to input purchase information about an article; and
a member identification information input mechanism configured to input identification information about a member;
wherein, in response to purchases of a particular article by the member, the terminal device inputs purchase information about the article and identification information about the member with the purchase information input mechanism and the member identification information input mechanism to send the information to the server,
the server identifies the attribute information about the member corresponding to the received identification information and identifies the service information managed by the service information management mechanism using the attribute information, the purchase information, and a targeting definition table,
the targeting definition table comprises the purchase information and the attribute information and if the purchase information correlates with the attribute information and the identification information correlates with the attribute information, then an intersection point of the correlated purchase information and the correlated attribute information provides sample information including a target demographic to receive a sample,
the server returns the sample information determined using the targeting definition table to the terminal device,
the terminal device outputs information indicating the sample to be provided to the member based on the returned sample information,
the terminal device inputs information about the sample when the sample is provided to the member,
the attribute information about the member further includes sex, age, occupation, member interests and member preferences,
the mobile information terminal comprises:
an input/output management section configured to provide for input and output functions using a keyboard, microphone, speaker, and display;
a communication section configured to perform wireless data communication;
an application management section configured to perform control of various functions related to applications stored on the mobile information terminal;
a member information management storage section that stores the member identification information that is inputted into the mobile information terminal with the input/output management section;
a service information storage section that stores service information output from the terminal device, the service information pertains to the sample provided to the member; and
a questionnaire management section that stores a questionnaire output from the terminal device, the questionnaire pertains to questions regarding the sample provided to the member,
the mobile information terminal is a cell phone belonging to the member,
the questionnaire is completed using the input/output management section and transmitted to the server using the communication section,
the terminal device further comprises a purchase information management section configured to calculate an amount of points based on the purchase of the particular article,
the terminal device sends the calculated points to the server, and the server adds the points to the points accumulated from purchases of articles by the member
the terminal device sends the points accumulated from purchases of articles by the member to the mobile information terminal for storage in the member information management storage section,
the server further comprises a service information storage section that stores service information, and content of the service information is set based on the attribute information of the member, wherein the content of the service information includes information or digital content that matches particular interests of the member provided in the attribute information,
the information or the digital content is provided to the member according to the points accumulated from purchases of articles by the member, and
the questionnaire is sent to the mobile information terminal via infrared communication from the terminal device.

2. The service provision system according to claim 1, wherein:
the service information management mechanism of the server manages the information about the samples to be distributed to the member as the service information and returns the sample information identified using the identification information and the purchase information, to the terminal device.

3. The service provision system according to claim 1, wherein:
the server further comprises:
an application storage mechanism storing an application program that manages the members; and an application program sending control mechanism configured to give a unique ID to the application program stored in the application storage mechanism and sending the application program to a particular information processor; and the terminal device inputs the unique ID of the application program via the member identification information input mechanism to send the unique ID to the server; and the member information management mechanism of the server manages the unique ID given to the application program by the application program sending control mechanism as authentication information about a member who is the user of the information processor, and, when receiving the unique ID from the terminal device, performs authentication using the unique ID.

4. The service provision system according to claim 3, wherein:

the service information management mechanism of the server manages data files available in the application program as the service information and returns a data file identified using the identification information and the purchase information, to the terminal device; and the terminal device returns the data file, the service information returned from the server, to the information processor.

5. The service provision system according to claim 1, wherein:

the terminal device further comprises a questionnaire storage mechanism configured to store questionnaire forms created according to the kinds of the service information to be provided for the members; and the server sends information identifying a questionnaire form to be distributed to a particular member together with the service information, to the terminal device.

6. The service provision system according to claim 1, wherein the terminal device is a terminal of a POS (point-of-sales) system.

7. The service provision system according to claim 1, wherein:

the server further comprises:
an application storage mechanism storing an application program that manages the members; and
an application program sending control mechanism configured to give a unique ID to the application program stored in the application storage mechanism and sending the application program with the unique ID to the cell phone belonging to the member;

the terminal device inputs the unique ID of the application program via the member identification information input mechanism to send the unique ID to the server; and the member information management mechanism of the server manages the unique ID given to the application program by the application program sending control mechanism as authentication information about the member, and, when receiving the unique ID from the terminal device, performs authentication using the unique ID.

8. A service provision system comprising:
a server comprising a central processing unit (CPU) and a memory connected to the CPU for managing information about members;
a terminal device connected to the server via a network; and
a mobile information terminal;
the server comprising:
a member information management mechanism configured to manage identification information and attribute information about the members, wherein the attribute information includes points accumulated from purchases of articles by the members; and a service information management mechanism configured to manage service information set in association with the attribute information about the members and kinds of articles;

the terminal device comprising:
a purchase information input mechanism configured to input purchase information about an article; and
a member identification information input mechanism configured to input identification information about a member; and the mobile information terminal comprises:
an input/output management section configured to provide for input and output functions using a keyboard, microphone, speaker, and display;
a communication section configured to perform wireless data communication;
an application management section configured to perform control of various functions related to applications stored on the mobile information terminal;
a member information management storage section that stores the member identification information that is inputted into the mobile information terminal with the input/output management section;
a service information storage section that stores service information output from the terminal device, the service information pertains to one of predetermined samples and predetermined digital content to be provided to the member; and
a questionnaire management section that stores a questionnaire output from the terminal device, the questionnaire pertains to questions regarding the one of predetermined samples and predetermined digital content provided to the member;

wherein, in response to purchases of a particular article by the member, the terminal device inputs identification information about the member via the member identification information input mechanism to send the identification information to the server;

the server identifies the attribute information about the member corresponding to the identification information and identifies, using a targeting definition table, the service information associated with the attribute information among the service information managed by the service information management mechanism and returns the service information to the terminal device, wherein the targeting definition table comprises the purchase information about the article and the attribute information about the member and if the purchase information correlates with the attribute information and the identification information correlates with the attribute information, then an intersection point of the correlated purchase information and the correlated attribute information defines the service information including the one of predetermined samples and predetermined digital content to be provided to the member;

the terminal device identifies a service to be provided for the member using the purchase information inputted by the purchase information input mechanism and the service information returned by the server, the attribute information about the member further includes sex, age, occupation, member interests and member preferences, the mobile information terminal is a cell phone belonging to the member, the questionnaire is completed using the input/output management section and transmitted to the server using the communication section, the terminal device further comprises a purchase information management section configured to calculate an amount of points based on the purchase of the particular article, the terminal device sends the calculated points to the server, and the server adds the points to the points accumulated from purchases of articles by the member the terminal device sends the points accumulated from purchases of articles by the member to the mobile information terminal for storage in the member information management storage section, the server further comprises a service information storage section that stores the service information, and content of the service information is set based on the attribute information of the member, wherein the content of the service information includes information or the digital content that matches particular interests of the member provided in the attribute information, the information or the digital content is provided to the member according to the points accumulated from purchases of articles by the member, and the questionnaire is sent to the mobile information terminal via infrared communication from the terminal device.

9. The service provision system according to claim 8, wherein:

the service information management mechanism of the server manages information about the predetermined samples to be distributed to the members as the service information; and the terminal device determines a sample to be distributed to the member who has purchased the particular article based on the sample information returned from the server.

10. The service provision system according to claim 8, wherein:

the server further comprises:

an application storage mechanism storing an application program that manages members; and an application program sending control mechanism configured to give a unique ID to the application program stored in the application storage mechanism and sending the application program to a particular information processor; and the terminal device inputs the ID of the application program via the member identification information input mechanism to send the ID to the server; and the member information management mechanism of the server manages the ID given to the application program by the application program sending control mechanism as authentication information about a member who is the user of the information processor, and, when receiving the ID from the terminal device, performs authentication using the ID.

11. The service provision system according to claim 10, wherein:

the service information management mechanism of the server manages data files available in the application program as the service information; and the terminal device returns the data file, the service information returned from the server, to the information processor.

12. The service provision system according to claim 8, wherein:

the terminal device further comprises a questionnaire storage mechanism configured to store questionnaire forms created according to the kinds of the service information to be provided for the members; and the server sends information identifying a questionnaire form to be distributed to a particular member together with the service information, to the terminal device.

13. A service provision system according to claim 8, wherein the terminal device is a terminal of a POS (point-of-sales) system.

* * * * *